(12) United States Patent
Lampe (10) Patent No.: US 6,213,527 B1
(45) Date of Patent: Apr. 10, 2001

(54) WEED-TREE REMOVER

(76) Inventor: John K. Lampe, 262 S. Griggs St., St. Paul, MN (US) 55105

(*) Notice: Subject to any disclaimer, the term of this patent is extended or adjusted under 35 U.S.C. 154(b) by 0 days.

(21) Appl. No.: 09/195,532

(22) Filed: Nov. 18, 1998

(51) Int. Cl.[7] ....................................................... A01B 1/20
(52) U.S. Cl. ........................... 294/50.6; 172/375; 254/132
(58) Field of Search .......................... 294/49, 50.6, 50.8, 294/50.9, 51, 55.5; 30/315, 317, 318; 111/101, 106; 172/371, 375, 376, 378, 380, 381; 254/22, 25, 131, 132

(56) References Cited

U.S. PATENT DOCUMENTS

| | | | |
|---|---|---|---|
| 82,568 | 11/1868 | Tyzick et al. . | |
| 173,399 | * 2/1876 | Engle | ..................................... 172/375 |
| 222,295 | 12/1879 | McKeever . | |
| 796,592 | * 8/1905 | Matthiesen | ............................ 172/375 |
| 1,239,653 | * 9/1917 | Willard | .............................. 172/375 X |
| 1,687,986 | * 10/1928 | Mitter | ..................................... 172/381 |
| 1,867,086 | * 7/1932 | Meixell | ............................ 294/50.6 X |
| 1,869,573 | * 8/1932 | McMeans | ............................... 172/375 |
| 2,040,751 | * 5/1936 | Marseilles | ............................. 172/375 |
| 2,642,305 | * 6/1953 | Butler | ............................... 294/50.6 X |
| 3,293,674 | * 12/1966 | Sapia | ................................ 294/50.6 X |
| 3,952,812 | * 4/1976 | Lucan | ..................................... 172/375 |
| 3,957,299 | * 5/1976 | Johnson et al. | ....................... 294/50.9 |
| 4,244,560 | 1/1981 | Hawkins . | |
| 4,427,182 | 1/1984 | Marik . | |
| 4,454,792 | 6/1984 | Burris . | |
| 4,826,137 | 5/1989 | Ahrgal . | |
| 4,844,416 | 7/1989 | Hand . | |
| 4,856,759 | 8/1989 | Ness . | |
| 4,997,163 | 3/1991 | Henning . | |
| 5,100,104 | 3/1992 | Wagner . | |
| 5,322,264 | 6/1994 | Giambro . | |
| 5,447,289 | 9/1995 | Callahan . | |
| 5,467,830 | 11/1995 | Watson . | |
| 5,476,298 | 12/1995 | Etemadian . | |
| 5,490,374 | 2/1996 | Calande . | |
| 5,535,833 | 7/1996 | Mathews . | |
| 5,609,325 | 3/1997 | DeArmond . | |
| 5,664,819 | 9/1997 | Conrad . | |
| 5,743,340 | 4/1998 | Giacomini . | |
| 5,857,529 | 1/1999 | Nguyen . | |

* cited by examiner

Primary Examiner—Johnny D. Cherry (57) ABSTRACT

Generally, the present invention relates to an improved implement for removing objects embedded in the ground and more particularly to a manually operated implement for removal of entire plants, root and all, such as unwanted saplings, vines, and large weeds with sturdy stems. In accordance with one embodiment of the invention, an implement is provided which includes a handle, attached to a head with a gripping device. The head includes a flared rear portion and a claw with two flanges on the front portion. The bottom face of the head is generally smooth. The top face of the head includes a collar for attachment to the handle. The gripping device rests atop the collar of the head and includes an extension which projects over the surface of the top face forming an aperture.

18 Claims, 9 Drawing Sheets

WEED-TREE REMOVER

FIELD OF INVENTION

The present invention generally relates to implements used to remove objects imbedded in the ground and, more particularly, relates to a manually operated implement for removal of entire plants, root and all, such as unwanted small trees, vines, and large weeds with sturdy stems. The purpose of the invention is to simplify the task of permanently removing such plants with an implement that applies leverage for the removal and does not require strenuous digging or the use of herbicides.

BACKGROUND OF THE INVENTION

Gardeners, homeowners, caretakers, landscapers, and foresters encounter numerous unwanted small trees, vines and fibrous weeds. There may be many reasons to remove these plants, collectively referred to in this application as "weed-trees." They may be unsightly, they may have stickers or burrs that attach to the clothes of humans or the coats of pets and other animals. Perhaps most significantly, species of weed-trees have been identified as noxious or restricted noxious weeds. Such identification may be for many different reasons. Often weed-trees are identified as restricted noxious weeds because they inhibit the growth of desirable plants such as cultivated or native species. For example, in the northeastern and midwestern parts of the United States certain species of buckthorn have invaded native woodland areas and created an understory of brush that crowds out native trees such as oak, maples, and ash. There is thus a strong need for these weed-trees to be removed.

Weed-trees, however, are often difficult to remove by pulling or other traditional weeding techniques because their roots anchor them solidly in the ground. Oftentimes weed-trees grow near foundations of buildings, in planting beds with rock or plastic mulch, in rocky soils, or next to desirable plants. Such conditions complicate the removal. Digging out weed-trees may be difficult due to the proximity of other desirable plants or rocks on the surface or in the soil. The use of herbicides may not be an option given the proximity of desirable plants or a reluctance to use potentially harmful chemicals. Cutting weed-trees may only encourage vigorous re-growth.

The present invention is intended primarily for the easy removal of such unwanted plants. The implement also could remove small posts, stakes, or poles; remove concrete forms; or lift portions of heavy objects such as large pavers or small concrete slabs. The implement could be constructed with a sharp edge on one end of the head for trenching and for chopping objects such as roots. A claw on the other end could be used not only for tree removal but also for cultivating soils and for digging smaller weeds, trees, or other items from the ground.

There are tools presently available intended for the removal of weed trees. One tool is referred to as the "Weed and Brush Puller." Another tool is referred to as the "Weed Wrench." Both of these tools use clamping mechanisms to grip the stem of the weed-tree and then use leverage for the removal of the weed-tree.

The present invention represents several advances over these tools. First, the present invention has a limited number of parts and at least one embodiment has no moving parts. Multiple parts and moving parts tend to increase the cost of manufacture or assembly. They also increase the potential for failure of the device. Second, the present invention can be used for the removal of a greater variety of weed-trees. For example, the stems of weed-trees can vary dramatically in size and shape. Oftentimes, one encounters a stem which has been cut near the base and re-sprouted or a weed-tree may have multiple stems or very low branches. Because the existing tools identified above use clamping mechanisms to engage the stem, these tools may have difficulty in gripping a weedtree that has been cut or one with multiple branches or stems near the ground. Third, the present invention is more versatile. It can clear dirt or debris around the stem to ease removal or chop roots. The present invention can also be used to pry objects such as stakes or ones embedded in the ground or other media.

SUMMARY OF THE INVENTION

Generally, the present invention relates to an improved implement for the removal of unwanted trees, vines, weeds, and other objects from the ground One embodiment of the invention discloses a hand implement which includes a handle, a head, and gripping device. The head attaches to the handle in the same general way that the head of a maul or sledgehammer attaches to its handle. The gripping device attaches to the handle just above the head. The head and gripping device may be made of cast iron, steel, or a composite material. The handle may be made of fiberglass, metal, or wood The handle, head, and gripping device may be attached to each other by various means. For example, if the handle is made of fiberglass, the head, handle, and gripping hook may be bonded to each other with an adhesive such as epoxy.

Generally, the invention works by contacting the stem of a weed-tree near that point where the stem enters the ground. The head and gripping device grip the stem, and the user directs force to the handle in such a way that the bottom surface of the head acts as a fulcrum that lifts the weed-tree from the ground without severing the stem from the main roots of the plant.

The above summary of the present invention is not intended to describe each illustrated embodiment of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described, although all embodiments described are intended to fall within the claims of this invention. On the contrary, the intention is to cover all modifications, equivalents, and alternatives falling within the spirit and scope of the invention as defined by the appended claims.

DETAILED DESCRIPTION OF THE DRAWINGS

The present invention is believed to be applicable primarily to the removal of small trees, vines, and large weeds with strong stems or trunks or to the removal of stakes or other objects embedded in the ground. While the present invention is not so limited, an appreciation of various aspects of the invention will be gained through a discussion of the exemplary embodiments in connection with the examples provided below.

Figure 1:
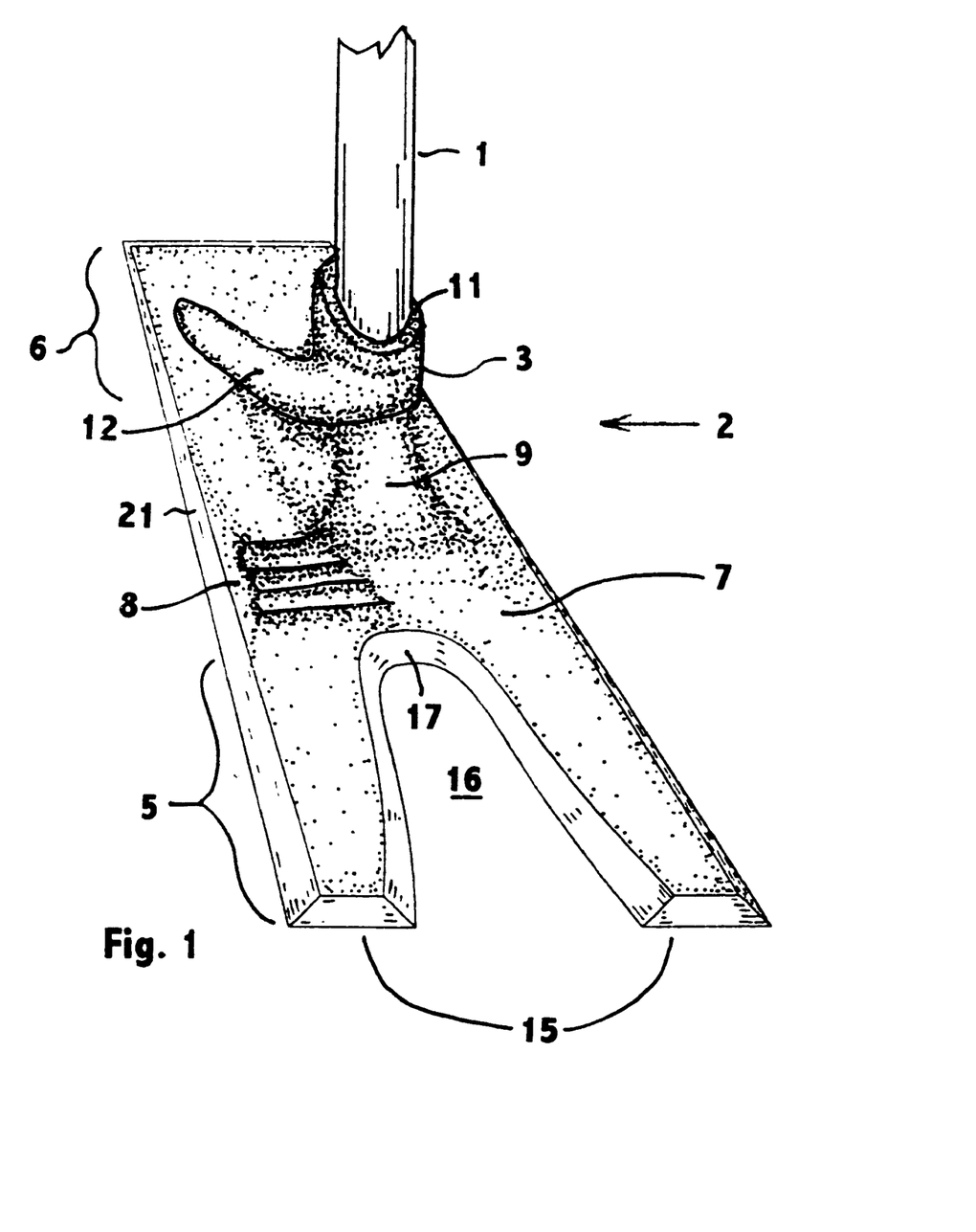
FIG. 1 is a perspective view of one embodiment of the implement standing upright.

One embodiment of the invention is an implement which includes a handle 1, a head 2 and a gripping device 3. One embodiment of the fully assembled invention is shown in FIG. 1. The head 2 may be a single piece of cast iron, steel, or a composite material. The head 2 includes: a smooth bottom face 4; a claw 5 on the front end; a flared rear portion 6 on the other end; and, on the top face 7 of the head 2, gripping ridges 8 and a collar 9 surrounding the head opening 10 for the handle 1. The gripping device 3 consists of a collar 1 which encircles the handle and a v-shaped gripping extension 12 attached to the collar 11. The collar 11 of the gripping device rests atop the collar 9 of the head with the apex of the v-shaped extension 12 pointing forward.

The handle 1 may be constructed from wood, fiberglass, or other composite materials and could resemble handles for implements such as mauls and sledgehammers. Fiberglass may be preferable because of its strength. One end of the handle 1 fits into the opening 10 encircled by the head and gripping device collars 9, 11. In this embodiment the handle 1 runs parallel to a vertical reference axis 13 and the head runs parallel to a horizontal reference axis 14.

The claw 5 consists of two flanges 15 which form a "v" 16. The "v" 16 points toward the center of the head. The gripping ridges 8 consist of a series of small, relatively sharp ridges rising step-like on the top side of the head from the crotch 17 up one side of the head collar 9. All gripping ridges 8 run approximately perpendicular to the horizontal reference axis 14 and reach a position parallel to the vertical reference axis as they proceed up the head collar 9.

Figure 2:
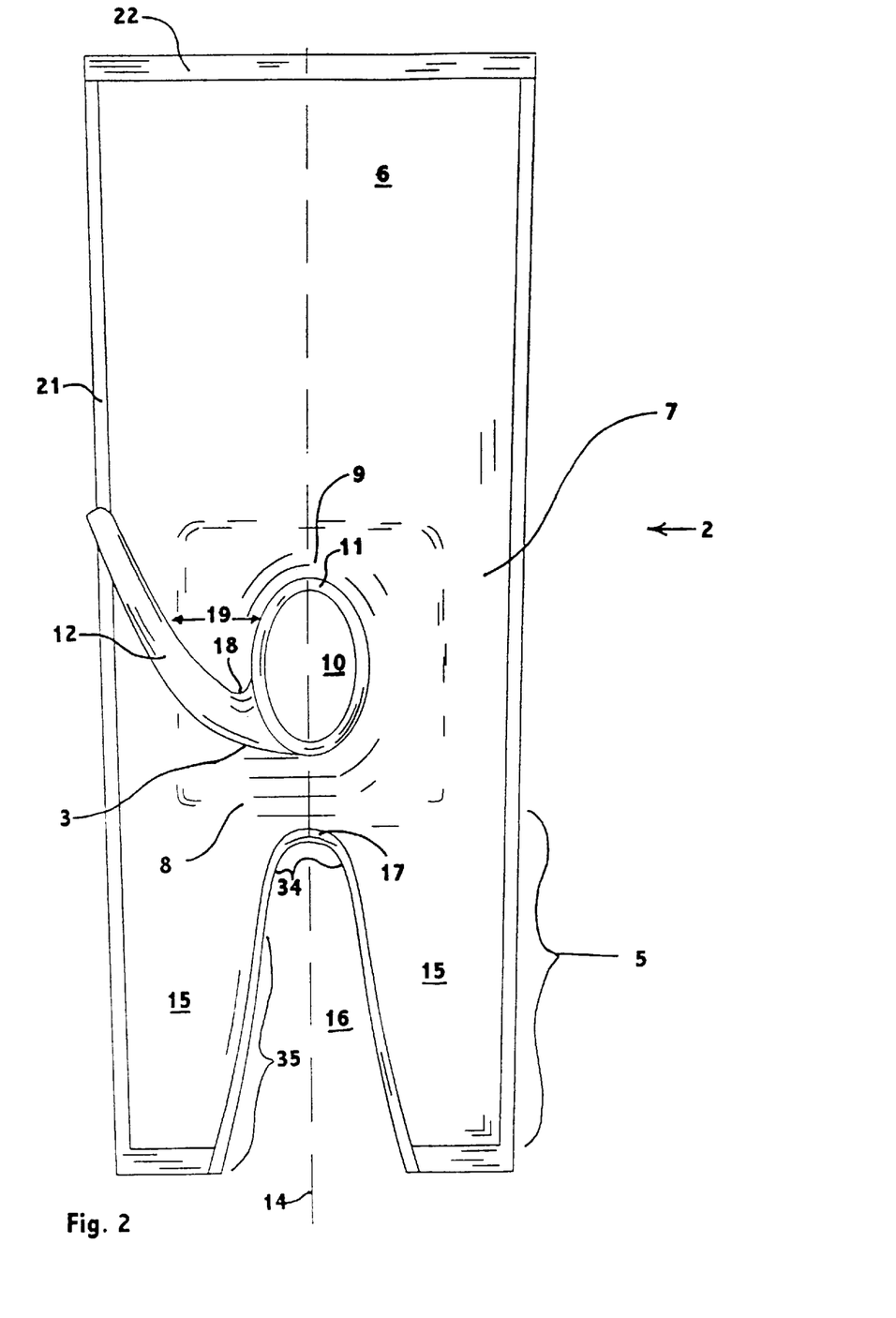
FIG. 2 is a top view of one embodiment of the implement.
Figure 4:
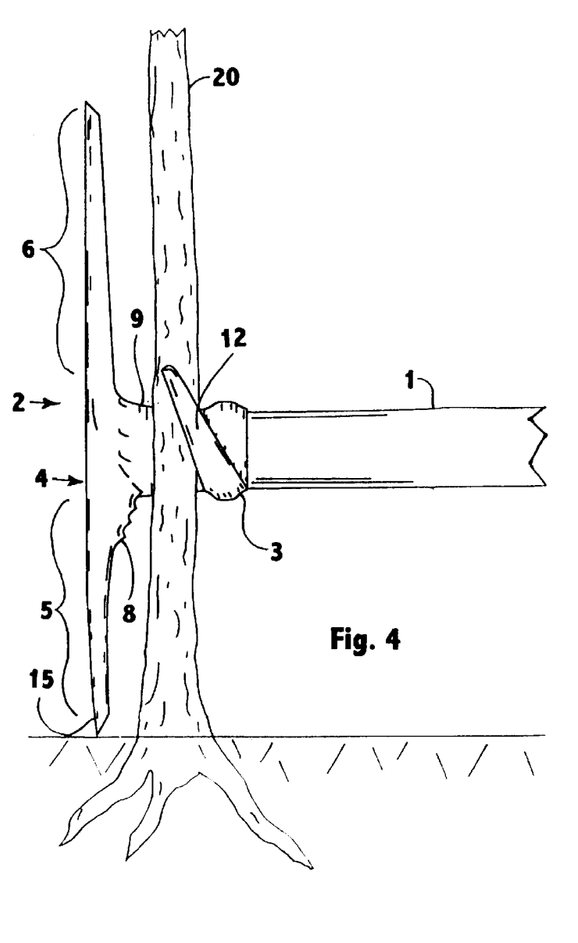
FIG. 4 is a side view of one embodiment of the implement wherein the stem of a weed-tree is positioned in the aperture between the gripping extension and the gripping ridges.

The v-shaped extension 12 points outward from the handle 1 above the gripping ridges 8 as shown in FIG. 1 and 2. The crotch 18 of the v-shaped extension 12 points board and upward. The two tips of the "v" point rearward and downward. Together the v-shaped extension 12 and the gripping ridges 8 create an aperture 19 into which the stem 20 of a plant can be inserted as shown in FIG. 4. The inner side of the v-shaped extension 12 that would come in contact with the stem 20 of the plant may also have ridges which would enhance the gripping of the stem 20.

Figure 3:
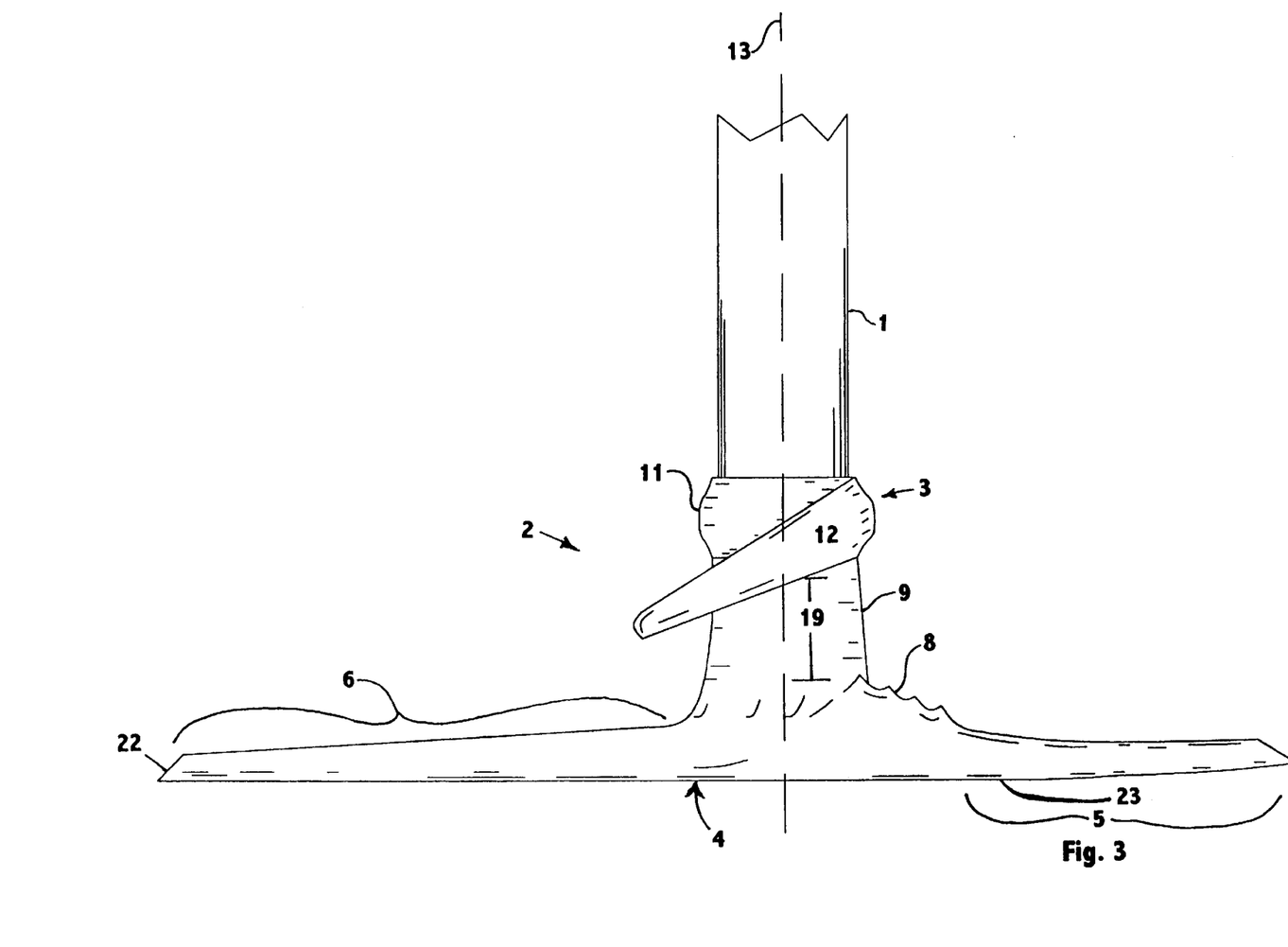
FIG. 3 is a side view of one embodiment of the implement.

The flared rear portion 6 is located on the opposite side from the claw 5. In this embodiment the side edges 21 of the tool slant down and out, making the surface area of the bottom face 4 greater than the surface area of the top face 7 as shown in FIG. 1 and 2. The increased surface area of the bottom face 4 improves the ability of the head to remain on the surface of the ground as opposed to sinking into the soil. In addition, it creates an edge on the front and rear portions of the head which can be easily sharpened. The sharpened edge 22, as illustrated in FIGS. 2 and 3, of the flared rear portion 6 can be used to chop roots and other objects.

The bottom face 4 of the head 2 is generally flat and smooth in this embodiment. From a point 23 forward from the head collar 9, the front end of the head 2, where the claw 5 is located, may rise slightly as shown in FIG. 3. A rise of approximately five to fifteen degrees may be suitable for many applications.

Figures 12, 13:
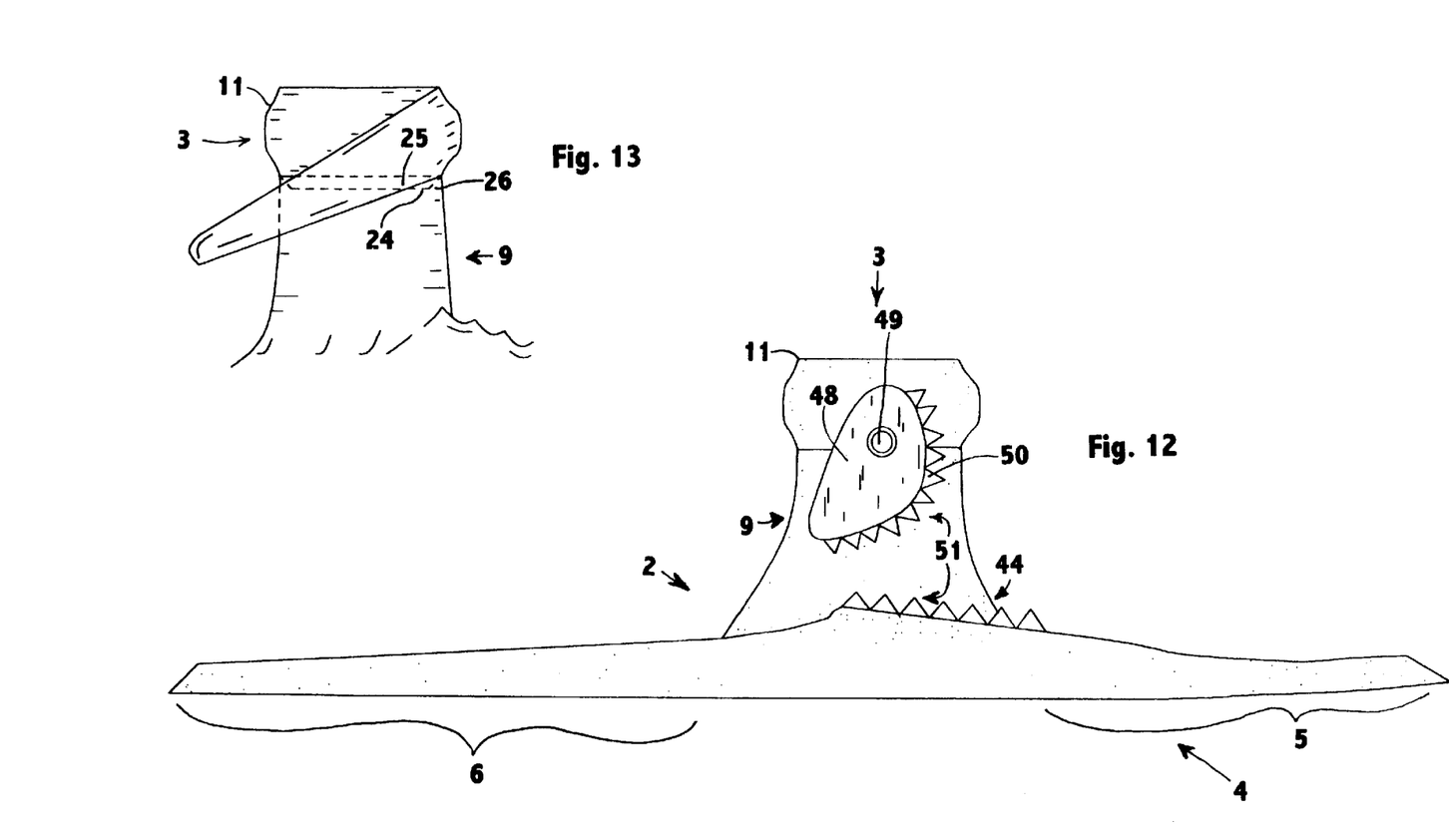
FIG. 12 is a side view of an embodiment of the implement with an adjustable gripping device in the form of a cam.
FIG. 13 is a side view of an embodiment of the head collar and gripping device with details of the joint between the head collar and gripping device.

The top rim 24 of the head collar 9 and the bottom rim 25 of the gripping device 3 may be shaped to improve the strength of the connection between the two pieces and to ensure that adhesive does not leak between the joint 26 between these two pieces while the adhesive is curing. For example, as shown in FIG. 13, the top rim 24 of the head collar 9 may have a concave surface. The bottom rim 25 of the gripping device collar 11 may have a convex surface, allowing it to rest within the seat created by the concave surface of the top rim 24 of the head collar 9.

Figure 5:
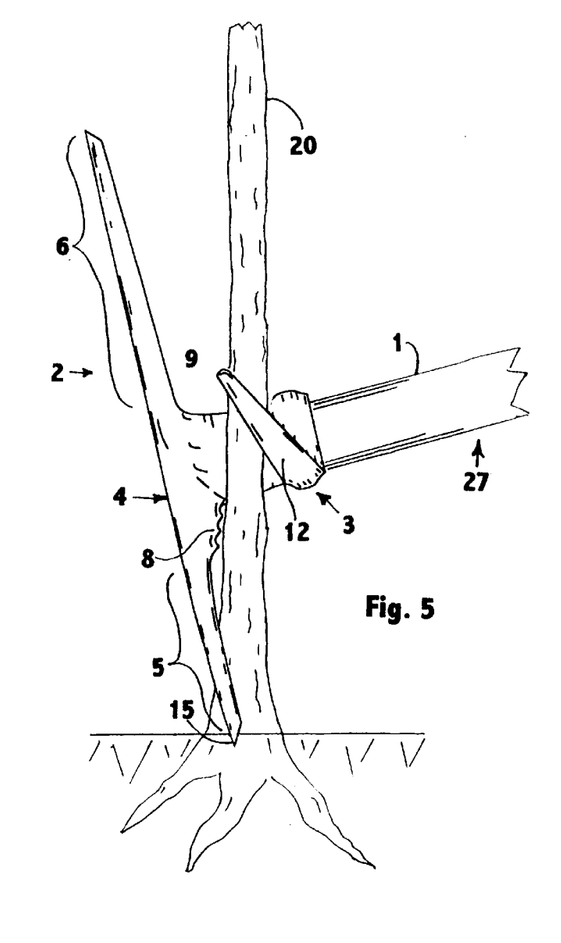
FIG. 5 is a side view of one embodiment of the implement wherein the stem of a weed-tree is placed between the flanges of the claw.
Figure 6:
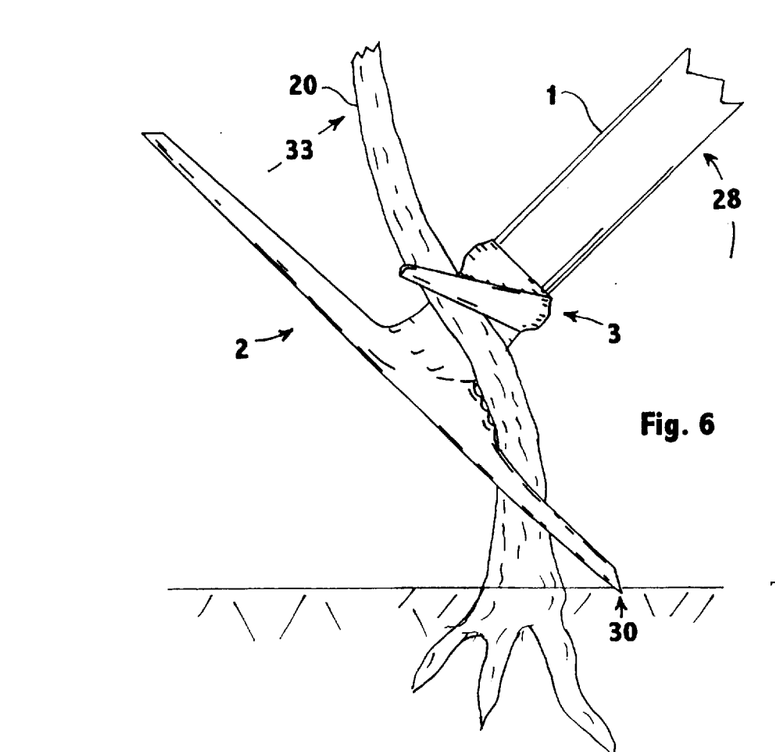
FIG. 6 is a side view of one embodiment of the implement wherein the stem of a weed-tree is bent to come in contact with the crotch.
Figure 7:
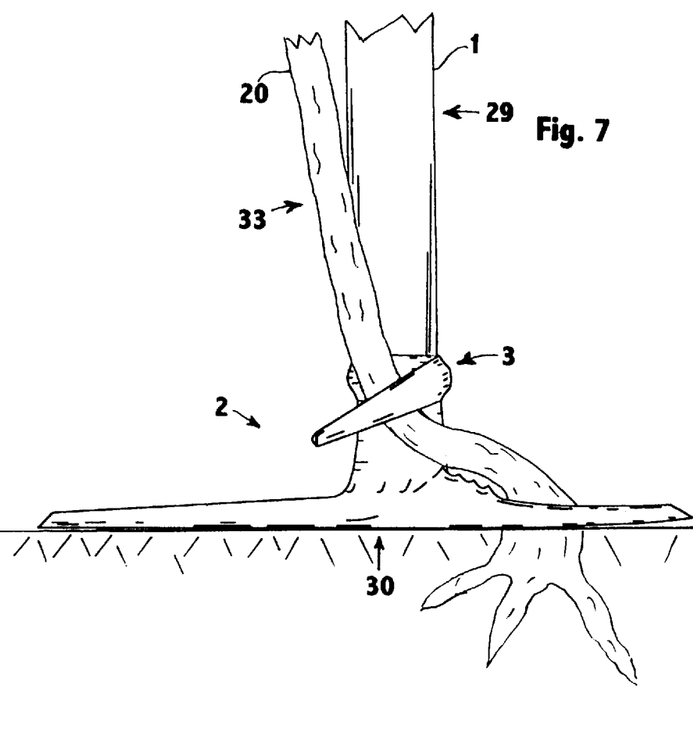
FIG. 7 is a side view of one embodiment of the implement wherein the stem of a weed-tree is bent further bringing the bottom face of the implement in contact with the ground.
Figure 8:
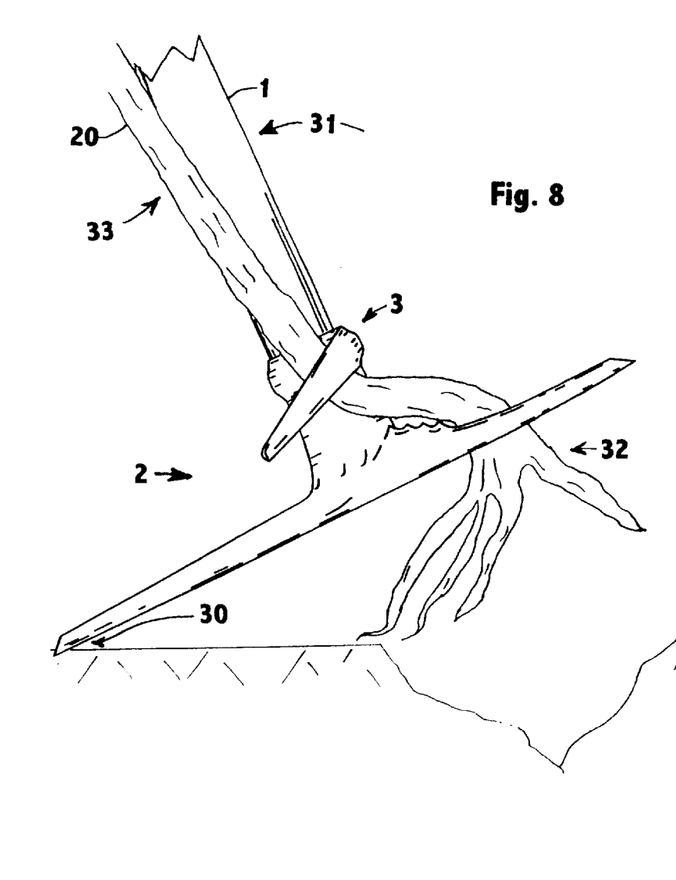
FIG. 8 is a side view of one embodiment of the implement wherein the weed-tree is being removed from the ground.

There are several ways to engage the implement disclosed here with the stem 20 of a weed tree. First, the head 2 of implement can be held perpendicular to the stem 20 of the plant with the claw 5 end pointing downward and positioned just above the ground as illustrated in FIG. 4. The head 2 is positioned so that the side with the v-shaped extension 12 is held next to the stem 20. The head 2 is pushed laterally toward the stem 20 so that the stem 20 runs through the aperture 19. Once the stem 20 is placed in the aperture 19, the user grips the handle 1 and applies an upward force 27 to the handle 1 such that the stem 20 is moved into the crotch 17 as illustrated in FIG. 5. Upward and lateral pressure 28 on the handle causes the stem 20 to be bent and wedged into the crotch 17 and the aperture 19 as illustrated in FIG. 6. Lateral pressure 29 applied to the handle 1 continues to bend the stem 20 and brings the bottom face 4 in contact with the ground as illustrated in FIG. 7. This moves the center point of the fulcrum rearward as shown in FIGS. 6 and 7. As lateral pressure 29 is applied to the handle 1, the center point of the fulcrum 30 moves from the front of the bottom face 4 to the rear as shown in FIG. 7 and 8. The center point of the fulcrum 30 moves to the rear of the bottom face 4 as lateral and downward pressure 31 is applied and the roots 32 of the weed-tree are removed from the ground as illustrated in FIG. 8.

For smaller weed-trees, the initial engagement of the head 2 with the stem 20 could proceed differently. The head 2 can be positioned so that the bottom face 4 rests on the ground and so that the stem 20 of the weed-tree is positioned at the crotch 17 of the claw. The user can then draw by hand the stem 20 of the weed-tree through the aperture 19 bringing the stem 20 into the position illustrated in FIG. 7. Removal of the weed-tree would then proceed as described above.

In weed-trees with larger stems, the natural spring 33 in the stem 20 as it is being bent from its approximately vertical position should wedge the stem 20 in the aperture 19 and the crotch 17 of the claw as illustrated in FIGS. 6 and 7. With smaller stems the spring will be less and it may be necessary to grip the stem with one hand and hold it against the handle as the handle is grasped or held in a forward position to ensure that the stem presses into the crotch of the gripping hook.

Smaller plants have greater potential to snap at the stem when being removed. Significant pressure may be applied with this implement at the point where the stem contacts the crotch 17 of the claw. To lessen the likelihood of stem breakage, the crotch 17 of the claw may be rounded 34 as shown in FIG. 2 to prevent sharp edges from cutting into the stem of smaller plants. From a point further forward along the interior edge of the flanges and extending to each end of the flanges of the claw, the edge 35 may be sharper as illustrated in FIG. 2. When a user attempts to remove larger trees, which are less susceptible to stem breakage, these two sharper edges would pinch the stem and enhance the ability to grip the stem.

Figure 9:
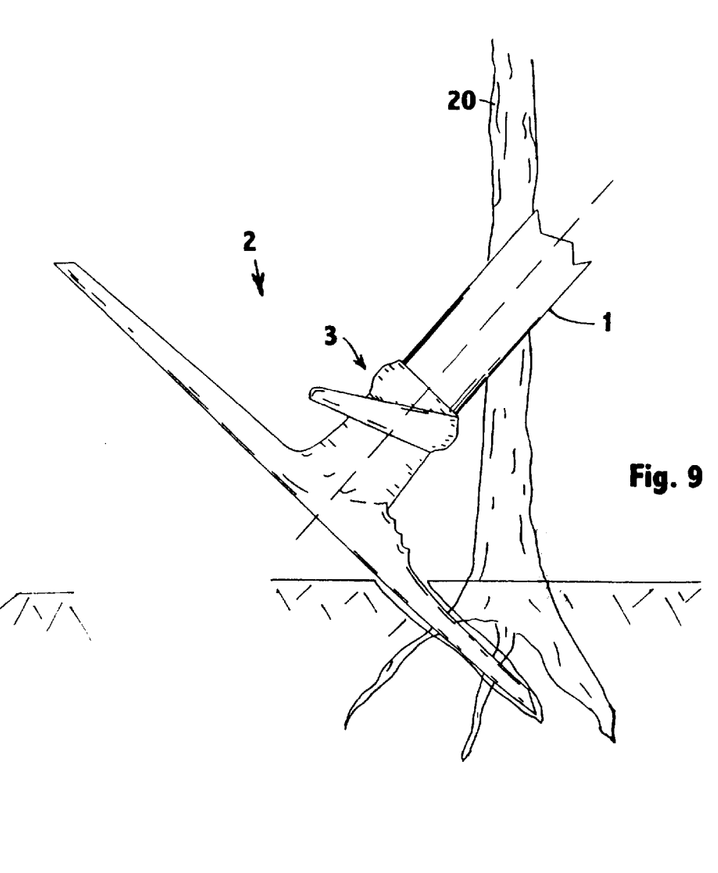
FIG. 9 is a side view of one embodiment of the implement wherein the claw is being driven into the ground to remove a weed-tree.

Weed trees with larger stems may not be easily bent and drawn through the aperture 19. Such trees may be removed by driving the claw 5 into the stem 20 below the surface of the ground, wedging the underground portion of the stem between the flanges 15 of the claw as shown in FIG. 9. The application of leverage would then proceed in the same general manner described above.

Stakes and other non-flexible objects can also be removed from media such as soil with the present invention. One method would include using a tool such as a locking grip pliers commercially sold as VISE-GRIPS® and locking it to the stem of the stake or other object. Upward pressure could be applied to the VICE-GRIPS® by placing the claw of the implement underneath the VISE-GRIPS®.

The head 2 could be made of various widths and lengths depending on the size of the stem of the plant being removed. The head 2 must be of sufficient size, especially the bottom face, to prevent the head from sinking too far below the surface of the ground when force is applied to the implement. A head with a bottom face that is about ten inches long, about three-and-one quarter inches wide at the front edge of the claw, and about four inches wide at the rear edge of the flared rear portion would be suitable for many applications. A handle of approximately a thirty-three inches or greater would be suitable for such a head. Heads and handles of other sizes may be suitable for smaller or larger weed-trees and other uses.

Figure 10:
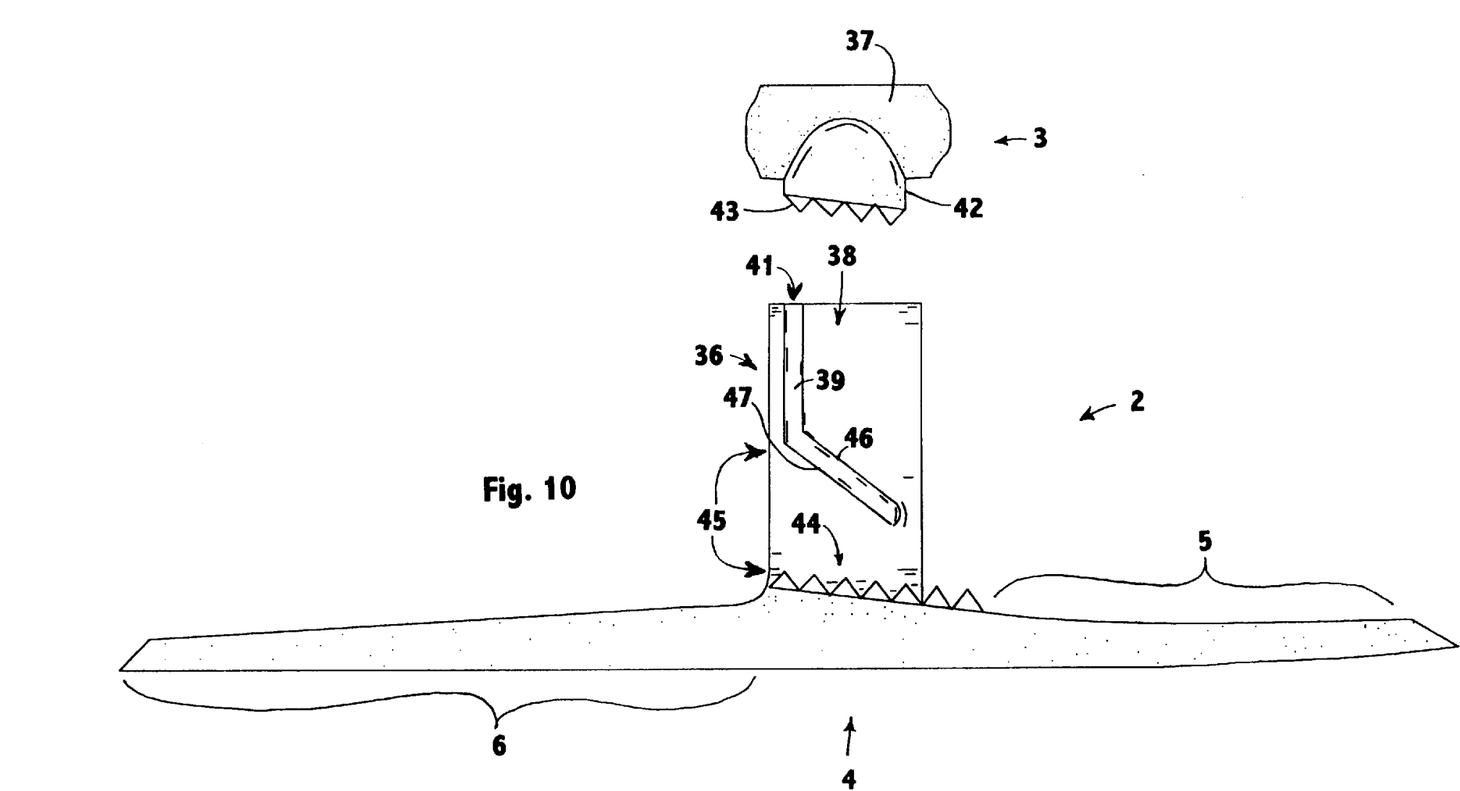
FIG. 10 is a side view of one embodiment of the implement with an adjustable gripping device detached from the head.
Figure 11:
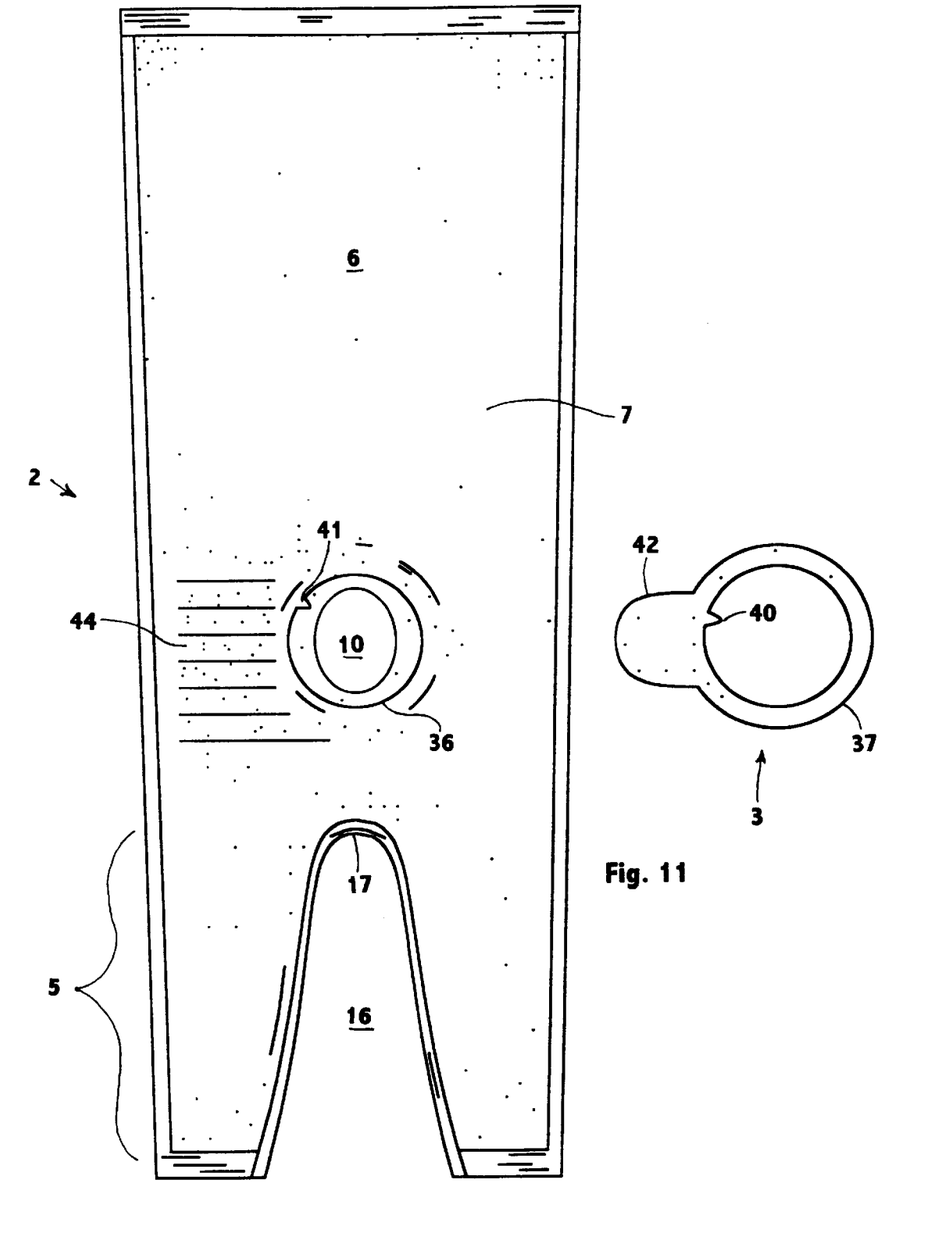
FIG. 11 is a top view of one embodiment of the implement with an adjustable gripping device detached from the head.

Other embodiments include ones with adjustable gripping devices which adjust to form locking jaws to grip the stem of the weed-tree. To accommodate such a modification, the gripping device would be altered. In this embodiment the collar 36 of the head ends higher as illustrated in FIG. 10. The collar 37 of the gripping device encircles 38 the upper portion of the head collar 36 as opposed to encircling the handle in the embodiments described earlier. The exterior surface of the head collar 36 would have a channel 39 cut into it but not through it as illustrated in FIG. 10. The channel 39 would run at a diagonal slanting from the front lower part of the collar to the back upper part as illustrated in FIG. 10. A nib 40 on the interior side of the opening of the adjustable gripping device could be added as shown in FIG. 11. The nib 40 could be of a size to fit into the channel 39 at point 41 during assembly.

As in the embodiments described above, the extension of the adjustable gripping device would protrude outward from the handle over gripping ridges 44 on the top face as shown in FIG. 10. Unlike the embodiments described above, the extension would form adjustable jaws with the gripping ridges 8. To accomplish this, the extension 42 could be shaped as illustrated in FIGS. 10 and 11, with ridges 43 located on the bottom facing surface of the extension 42. The gripping ridges 44 on the top face 7 would serve as the anvil for the adjustable jaws. When gripping a stem 20 in the aperture 45 formed by the extension 42 and the gripping ridges 44, the nib 40 would slide in the channel to accommodate the size of the stem. Forward pressure on the extension 42 and on the nib 40, caused either by the natural spring 33 of the stem or by manually drawing the stem forward, would force the nib 40 against the upper edge 46 of the channel, locking it in place. The contact of the extension 42 and the gripping ridges 44 with the stem 20 could be improved by slanting their surfaces forward and downward 47 as illustrated in FIG. 10.

Another embodiment employs a gripping device with a cam 48 as illustrated in FIG. 12. In this embodiment, the cam 48 would replace the v-shaped extension shown in FIGS. 1, 2, and 3. The cam 48 would rotate on a shaft 49. The cam 48 would have gripping notches 50. The gripping notches 50 would face the gripping ridges 44 of the top face. When the stem 20 of a weed-tree is placed in the aperture 51 between the cam and the gripping ridges, the cam would tighten as the stem is drawn forward and the aperture narrowed.

As noted above, the present invention is an implement intended to manually remove unwanted small trees or large weeds from the ground. The present invention should not be considered limited to the particular examples described above, but rather should be understood to cover all aspects of the invention as fairly set out in the attached claims. For example, while suitable materials, such as a fiberglass handle, and the like have been disclosed in the above discussion, it should be appreciated that these are provided by way of example and not of limitation as a number of other materials and so fort may be used without departing from the invention. Various modifications as well as numerous structures to which the present invention may be applicable will be readily apparent to those of skill in the art to which the present invention is directed upon review of the present specifications. The claims are intended to cover such modifications and structures.

I claim:

1. An implement for prying and applying leverage to objects and for removing objects retained in media such as small trees rooted in the ground comprising:

a) a handle having a top end and a bottom end positioned along a vertical reference axis, with the top end of the handle for gripping and applying force by the user of the implement;

b) a head extending along a horizontal reference plane defining a longitudinal reference axis and a lateral reference axis, with a bottom face, a top face, a collar defining a top rim and providing a point of attachment for the bottom end of the handle, the bottom end of the handle fixedly secured within the collar, a claw on a front end of the head and a rear portion of the head: and c) a vertically raised gripping device defining a rearwardly and laterally open notch.

2. The implement of claim 1, wherein the claw comprises two flanges forming a substantially v-shaped opening at the front end of the head which narrows and ends at a crotch, with the center of the crotch and v-shaped opening intersected by the longitudinal reference axis.

3. The implement of claim 2, wherein the claw has an interior edge which is sharper along the interior sides of the flanges farther from the crotch and is duller in the crotch and the area immediately surrounding the crotch.

4. The implement of claim 2, wherein the bottom face is a substantially smooth surface extending from the rear portion to the tips of the flanges and whose length is bisected by the longitudinal reference axis.

5. The implement of claim 4, wherein the bottom face is a substantially flat surface from the rear portion to a point forward of the midpoint of the longitudinal reference axis at which an upward curvature of the surface extends to the tips of the flanges.

6. The implement of claim 4, wherein the bottom face widens from the tips of the flanges to the rear portion in order to increase the bearing surface in the rearward area of the bottom face.

7. The implement of claim 2, wherein the surface area of the top face is less than the surface area of the bottom face thereby creating a larger bearing surface on the bottom face and thereby creating sharpenable edges on the tips of the flanges and on the rear portion.

8. The implement of claim 1, wherein the rear portion further comprises a flat underside forming the rear portion of the bottom face and a top side which forms the rear portion of the top face.

9. The implement of claim 1, wherein the head collar is located on the top face, positioned between the rear portion and the claw, and rises from the surface of the top face approximately parallel to the vertical reference axis.

10. The implement of claim 1, wherein the gripping device is an extension which protrudes over the top face forming an aperture between the extension and the top face.

11. The implement of claim 10, wherein the gripping device is a separate piece attached to the top rim of the head collar and includes a collar which encircles the handle.

12. The implement of claim 11, wherein the gripping device includes a collar with a bottom rim that is convex and mates with the surface of the top rim of the head collar which is concave thereby forming a joint which slants downward and inward.

13. The implement of claim 11, wherein the extension of the gripping device is a substantially a"v" shaped piece with the apex of the "v" facing forward and at least one side of the "v" slanting outward, rearward, and downward over the top face.

14. The implement of claim 1 further comprising gripping ridges on the top face of the head.

15. An implement for prying and applying leverage to objects and for removing objects retained in media such as small trees rooted in the ground comprising:
   a) a handle positioned along a vertical reference axis, with the top end of the handle for gripping and applying force by the user of the implement and the bottom end attached to a head;
   b) a head positioned along a horizontal reference axis, with a bottom face, a top face, a collar providing a point of attachment for the handle, and a claw on the front end of the head, the claw further defining two flanges forming a substantially v-shaped opening at the front edge of the head which narrows and ends at a crotch, and a flat rear portion of the head;
   c) the head collar is located on the top face, positioned between the rear portion and the claw, and rises from the surface of the top face approximately parallel to the vertical reference axis; and
   d) gripping ridges on the surface of the top face, running approximately parallel to each other, extending from the crotch of the claw, along the side of the collar, and up the same side of the collar.

16. An implement for prying and applying leverage to objects and for removing objects retained in media such as small trees rooted in the ground comprising:
   a) a handle positioned along a vertical reference axis, with the top end of the handle for gripping and applying force by the user of the implement and the bottom end attached to a head;
   b) a head positioned along a horizontal reference axis, with a bottom face, a top face, a collar providing a point of attachment for the handle, a claw on the front end of the head, gripping ridges on the top face and a flat rear portion of the head; and
   c) a gripping device which is connected to the head with an extension which protrudes to one side of the head, wherein the extension and gripping ridges on the top face form an aperture.

17. A tool, comprising:
   (a) a vertically extending handle, and
   (b) a head attached to a first vertical end of the handle and having,
      (i) a forward longitudinal end, a rearward longitudinal end, a first lateral side and a second lateral side,
      (ii) a claw proximate the first longitudinal end of the head defining a first forwardly and laterally open notch, and
      (iii) a gripping element configured and arranged vertically above the head in the same vertical direction as the handle and defining a rearwardly and laterally open second notch,
   (c) wherein a substantially linear object can be simultaneously positioned within the first and second notches.

18. A tool, comprising:
   (a) a vertically extending handle, and
   (b) a head attached to a first vertical end of the handle and having,
      (i) a top face, a bottom face, a forward longitudinal end and a rearward longitudinal end,
      (ii) a claw proximate the first longitudinal end of the head, and
      (iii) an area on the top face of the head having a roughened surface effective for frictionally engaging an object.

* * * * *